(12) United States Patent (10) Patent No.: US 8,522,528 B2
Faulder et al. (45) Date of Patent: Sep. 3, 2013

(54) SYSTEM FOR DIFFUSING BLEED AIR FLOW

(75) Inventors: Leslie John Faulder, San Diego, CA (US); Philip H. Schneider, Rancho Santa Fe, CA (US); Vin-King Yang, Scottsdale, AZ (US); John Richard Wiltshire, Bristol (GB); Jeffrey Eugene Tarczy, San Diego, CA (US); Neil Pryke, Epsom (GB)

(73) Assignee: Solar Turbines Inc., San Diego, CA (US)

( * ) Notice: Subject to any disclaimer, the term of this patent is extended or adjusted under 35 U.S.C. 154(b) by 1227 days.

(21) Appl. No.: 12/216,121

(22) Filed: Jun. 30, 2008

(65) Prior Publication Data

US 2009/0320496 A1 Dec. 31, 2009

(51) Int. Cl.
*F02K 1/46* (2006.01)
*F02K 3/02* (2006.01)
*F02K 1/00* (2006.01)
*F02C 6/08* (2006.01)

(52) U.S. Cl.
USPC .................................. 60/262; 60/231; 60/782

(58) Field of Classification Search
USPC .................. 60/231, 262, 751, 762, 782, 785, 60/795, 806; 239/265.17
See application file for complete search history.

(56) References Cited

U.S. PATENT DOCUMENTS

| 4,391,566 | A | | 7/1983 | Takamura |
| 4,907,406 | A | | 3/1990 | Kirikami et al. |
| 5,211,003 | A | | 5/1993 | Samuel |
| 5,257,906 | A | | 11/1993 | Gray et al. |
| 5,557,920 | A | | 9/1996 | Kain |
| 5,826,424 | A | | 10/1998 | Klees |
| 5,947,412 | A | * | 9/1999 | Berman ........................ 244/1 N |
| 5,951,246 | A | | 9/1999 | Uematsu et al. |
| 6,543,234 | B2 | | 4/2003 | Anand et al. |
| 6,589,489 | B2 | * | 7/2003 | Morrow et al. ............. 422/186.3 |
| 7,162,876 | B2 | * | 1/2007 | Hoff et al. ........................ 60/785 |
| 7,181,914 | B2 | | 2/2007 | Pidcock et al. |

* cited by examiner

*Primary Examiner* — Ehud Gartenberg
*Assistant Examiner* — Arun Goyal
(74) *Attorney, Agent, or Firm* — Finnegan, Henderson, Farabow, Garrett & Dunner LLP

(57) ABSTRACT

In one aspect, the present disclosure is directed an apparatus configured to diffuse a flow of bleed air. The apparatus having an inlet collar configured to receive the flow of bleed air in a direction substantially along a longitudinal axis of the apparatus. The apparatus further having an end wall longitudinally spaced apart from the inlet collar and configured to block the flow of bleed air in a direction substantially along the longitudinal axis. The apparatus also having a first diffuser wall spaced concentrically relative to a second diffuser wall, each of the first and second diffuser walls positioned between the inlet collar and the end wall and including a plurality of perforations configured to permit the flow of bleed air to exit the apparatus at an angle relative to the longitudinal axis.

20 Claims, 5 Drawing Sheets

SYSTEM FOR DIFFUSING BLEED AIR FLOW

TECHNICAL FIELD

The present disclosure relates generally to a system for diffusing bleed air and, more particularly, to a method and apparatus for diffusing bleed air flow.

BACKGROUND

Gas turbine engines (GTE) convert potential energy associated with air and fuel into energy, primarily in the form of mechanical rotation and heat. A conventional GTE may include a compressor assembly, a combustor assembly, and a turbine assembly. During operation, air is drawn into and compressed within the compressor assembly. The combustor assembly receives compressed air from the compressor assembly, supplies fuel thereto, and ignites and combusts the compressed air and fuel mixture. The combustion products are supplied to the turbine assembly and expanded to cause a turbine rotor to rotate, thereby producing rotational energy. The turbine may be coupled to the compressor assembly and one or more systems that use the rotational energy and/or thermal energy developed by the turbine. The exhaust generated is typically discharged into an exhaust outlet.

Under certain conditions, it is known to bleed a portion of the compressed air from the compressor assembly before it is permitted to mix with fuel and ignite during combustion. The compressed air bypassing the combustion process is known as bleed air, and the compressed air that is used in the combustion process is known as combustion air. There are various reasons for bleeding air before combustion including, for example, stabilizing combustion and controlling engine performance. The bleed air may be discharged directly to the atmosphere or into an exhaust outlet device to combine the bleed air and turbine exhaust before expelling both to the atmosphere. The bleed air discharged into the exhaust outlet device may have relatively high velocity (e.g., sonic) and pressure and may create shock waves that generate vibrations within the exhaust outlet device. The vibrations may cause undesirable noise and may fatigue the exhaust outlet device or other downstream components over time.

A GTE including a bleed air assembly is disclosed in U.S. Pat. No. 6,543,234 B2 issued to Anand et al. ('234 patent). The '234 patent discloses a gas turbine system including a compressor, a combustor, and a turbine powering a load. The '234 patent discloses a bleed air circuit that removes bleed air from the compressor and discharges it into an exhaust stack. The bleed air circuit includes a bypass valve to control the percentage of compressed air that bypasses the combustor as bleed air. The '234 patent also discloses that a portion of the bleed air may be expanded via an air expander to reduce pressure upstream of the exhaust stack.

The system of the '234 patent may insufficiently reduce vibrations in the exhaust stack because only a portion of the bleed air is designed to pass through the air expander. The system of the '234 patent may also be expensive and complex because the bleed air circuit includes a plurality of valves and other components to direct the bleed air from an air bleed inlet to the exhaust stack.

SUMMARY

In one aspect, the present disclosure is directed to an apparatus configured to diffuse a flow of bleed air. The apparatus includes an inlet collar configured to receive the flow of bleed air in a direction substantially along a longitudinal axis of the apparatus. The apparatus further includes an end wall longitudinally spaced apart from the inlet collar and configured to block the flow of bleed air in a direction substantially along the longitudinal axis. The apparatus also includes a first diffuser wall spaced concentrically relative to a second diffuser wall. Each of the first and second diffuser walls are positioned between the inlet collar and the end wall and includes a plurality of perforations configured to permit the flow of bleed air to exit the apparatus at an angle relative to the longitudinal axis.

In another aspect, the present disclosure is directed to a method of diffusing flow of bleed air from an engine through a diffuser. The method includes directing the flow of bleed air into the diffuser in a direction substantially along a longitudinal axis of the diffuser. The method further includes blocking the flow of bleed air along the longitudinal axis. The method also includes directing the flow of bleed air through perforations in each of a first diffuser wall and a second diffuser wall at an angle relative to the longitudinal axis to reduce velocity of the flow of bleed air.

DETAILED DESCRIPTION

Figure 1:
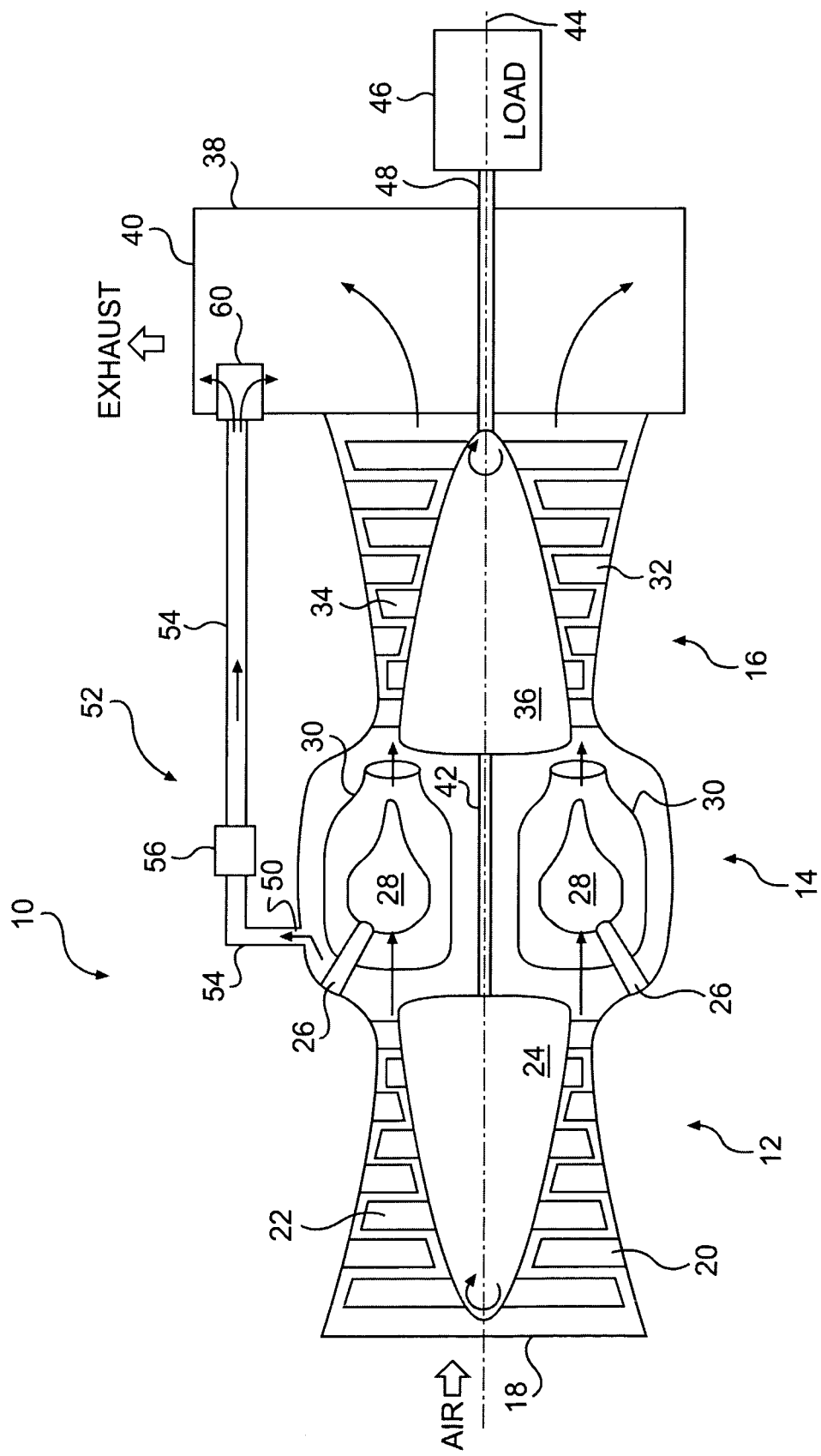
FIG. 1 is a schematic section view of an exemplary GTE in accordance with the present disclosure.

FIG. 1 illustrates an exemplary GTE 10, which may, for example, supply power to machines, such as vehicles, power generators, and pumps. GTE 10 may include a compressor section 12, a combustor section 14, and a turbine section 16.

Compressor section 12 may be configured to draw air into GTE 10 through an air inlet 18 and compress the air before it enters combustor section 14. Compressor section 12 may include stationary blades 20 and rotating blades 22 operably coupled to a compressor hub 24. Stationary blades 20 and rotating blades 22 may be shaped such that, as rotating blades 22 rotate, air may be drawn through compressor section 12 and compressed to increase the pressure and potential energy of the air upstream of combustor section 14.

The compressed air generated by compressor section 12 may enter combustor section 14, and fuel may be supplied to combustor section 14 via one or more fuel inlets 26. The fuel and at least a portion of the compressed air may be ignited in a combustion chamber 28 of a combustion liner 30. The combusted air and fuel (i.e., combustion products), may be directed toward turbine section 16. Turbine section 16 may include stationary blades 32 and rotating blades 34 operably coupled to a turbine hub 36. Rotating blades 34 may be configured to rotate as the combustion products are directed to pass through turbine section 16. The combustion products may be directed into an exhaust collector box 38 and to the atmosphere via an exhaust outlet 40. Compressor hub 24 and turbine hub 36 may be operably coupled to one another via a shaft 42 that rotates about a longitudinal drive axis 44. Turbine hub 36 may also be operably coupled to a load 46 via a drive shaft 48 for performing work.

Compressed air exiting compressor section 12 may be divided into either combustion air or bleed air. Combustion air may be mixed with fuel and ignited in combustion chamber 28. The bleed air may bypass the combustion process through a bleed air passage 50 into a bleed air assembly 52. Bleed air assembly 52 may include a bleed air pipe 54 extending from either a downstream portion of compressor section 12 (not shown) or from an upstream portion of combustor section 14 (i.e., before combustion occurs). The flow of compressed air into bleed air assembly 52 may be regulated via a bleed air valve 56. Valve 56 may be located along pipe 54 and may be actuated by an actuator 58 (shown in FIG. 2). Valve 56 may be any known valve capable of regulating compressed air flow. The bleed air that is permitted to pass through valve 56 may continue to pass through pipe 54 before entering a bleed air diffuser 60. Diffuser 60 may be disposed at least partially within exhaust collector box 38 such that the bleed air that passes through diffuser 60 may be directed into exhaust collector box 38.

Figure 2:
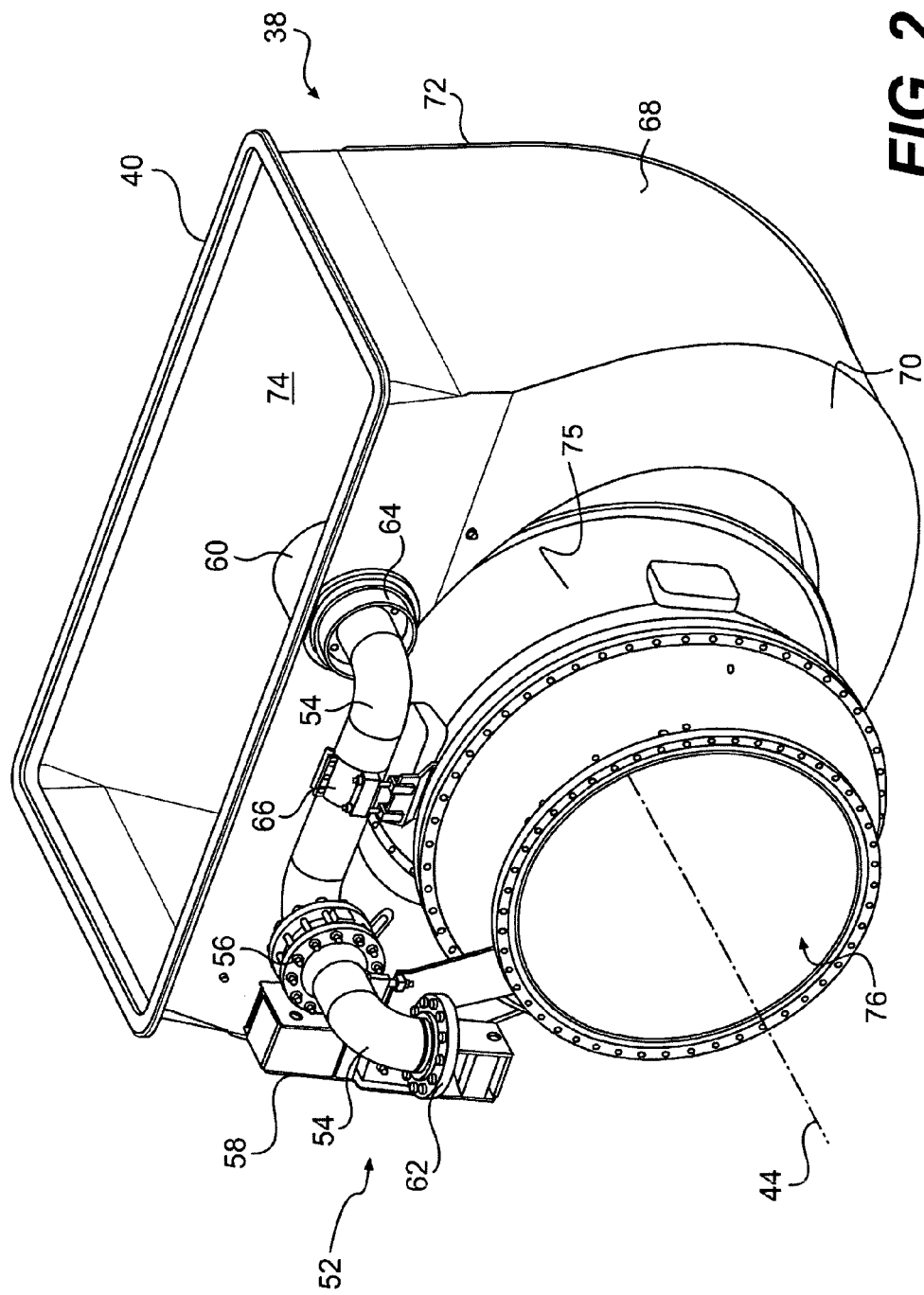
FIG. 2 is a partial, schematic perspective view of the exemplary GTE of FIG. 1.

As shown in FIG. 2, bleed air assembly 52 may include an inlet pipe flange 62 connecting an upstream end of pipe 54 to either the compressor section 12 or combustor section 14 at bleed air inlet passage 50. Bleed air assembly 52 may also include an outlet pipe flange 64 connecting a downstream end of pipe 54 to diffuser 60. Pipe 54 may include changes in direction or other obstructions that may reduce the bleed air velocity and pressure. Pipe 54 may be supported by at least one pipe support bracket assembly 66. It is contemplated that pipe support bracket assembly 66 may be fixed to GTE 10 (e.g., turbine section 16) and may be adjustable to allow for various pipe routing configurations and/or to allow for thermal expansion of pipe 54. Diffuser 60 may be cantilevered at a downstream end of bleed air assembly 52, such that pipe support bracket assembly 66 may support substantially the entire weight of diffuser 60 to reduce or substantially eliminate the weight of diffuser 60 carried by exhaust collector box 38.

Exhaust collector box 38 may include first and second opposing side walls 68 radially spaced from drive axis 44. Exhaust collector box 38 may also include a front wall 70 and a rear wall 72. Side walls 68, front wall 70, and rear wall 72 may define an exhaust collector chamber 74 for receiving exhaust air and bleed air. Exhaust air may enter exhaust collector chamber 74 through annular exhaust inlet 75 via exhaust inlet passage 76 and bleed air may enter exhaust collector chamber 74 through diffuser 60. The exhaust air and the bleed air collected in exhaust collector chamber 74 may be expelled through exhaust outlet 40 into the atmosphere.

The orientation of exhaust outlet 40 in a substantially vertical position (i.e., perpendicular to the horizon) may define a nominal exhaust collector box angle position (as shown in FIG. 2). It is contemplated that exhaust collector box 38 may be rotated about drive axis 44 to one of various angled positions (e.g., +45 degrees, +90 degrees, −45 degrees, and −90 degrees) from the nominal position in order to expel exhaust from exhaust outlet 40 in an alternative direction. It is contemplated that bleed air assembly 52 may include various configurations of pipe 54 and pipe support bracket assembly 66 to maintain the relative position of diffuser 60 with respect to front wall 70 when exhaust collector box 38 is positioned in the alternative angled positions.

Figure 3:
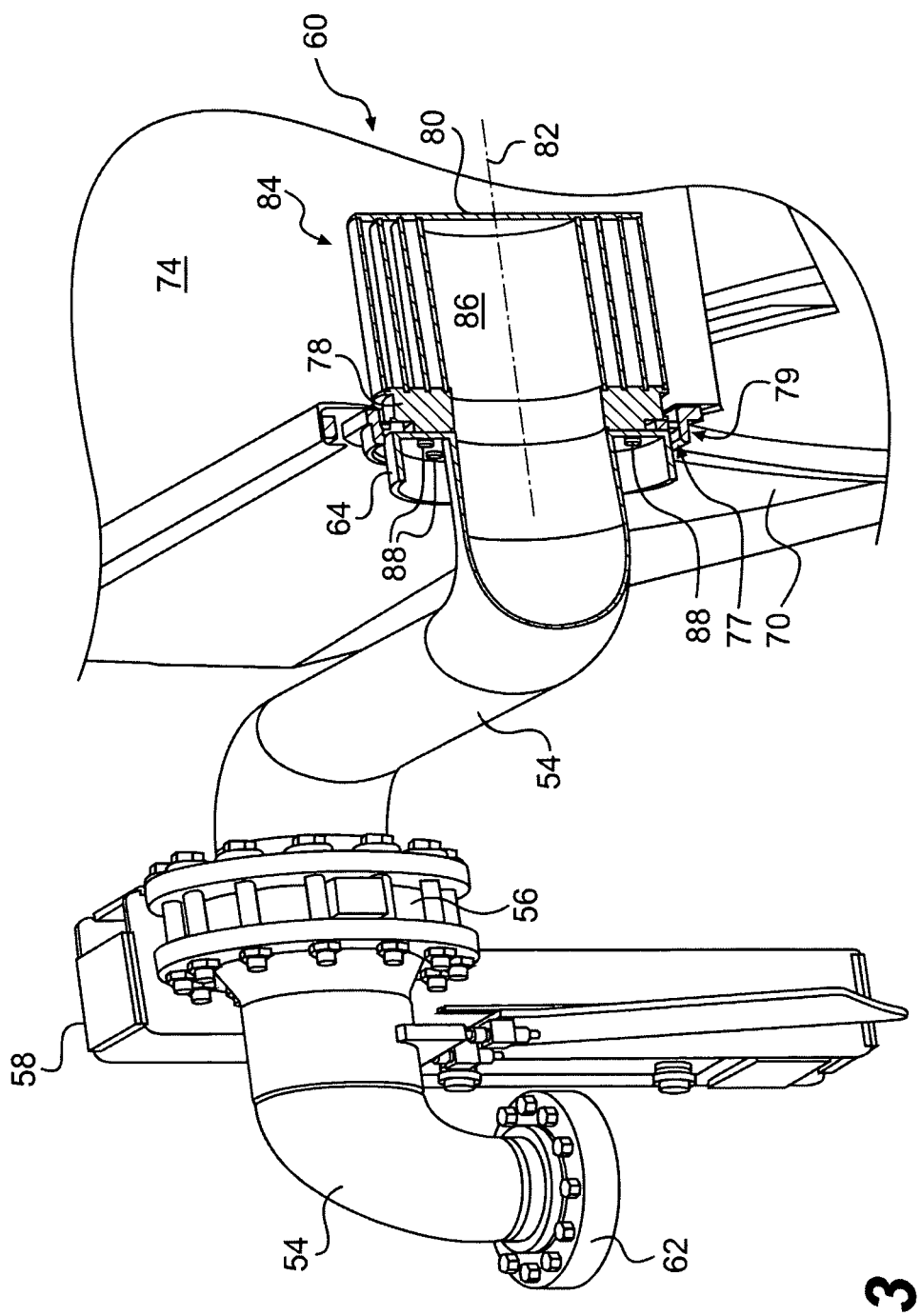
FIG. 3 is a schematic perspective section view of an exemplary bleed air assembly associated with the GTE of FIG. 1.

As shown in FIG. 3, front wall 70 may include a diffuser passage 77 with a shoulder 79 for receiving diffuser 60. Diffuser 60 may include an inlet collar 78 that may be spaced from an end wall 80 in a direction along a longitudinal axis 82. One or more diffuser walls 84 may be positioned between inlet collar 78 and end wall 80 to form a diffuser chamber 86. Inlet collar 78 may connect diffuser 60 to outlet pipe flange 64 via one or more fasteners 88.

Figure 4:
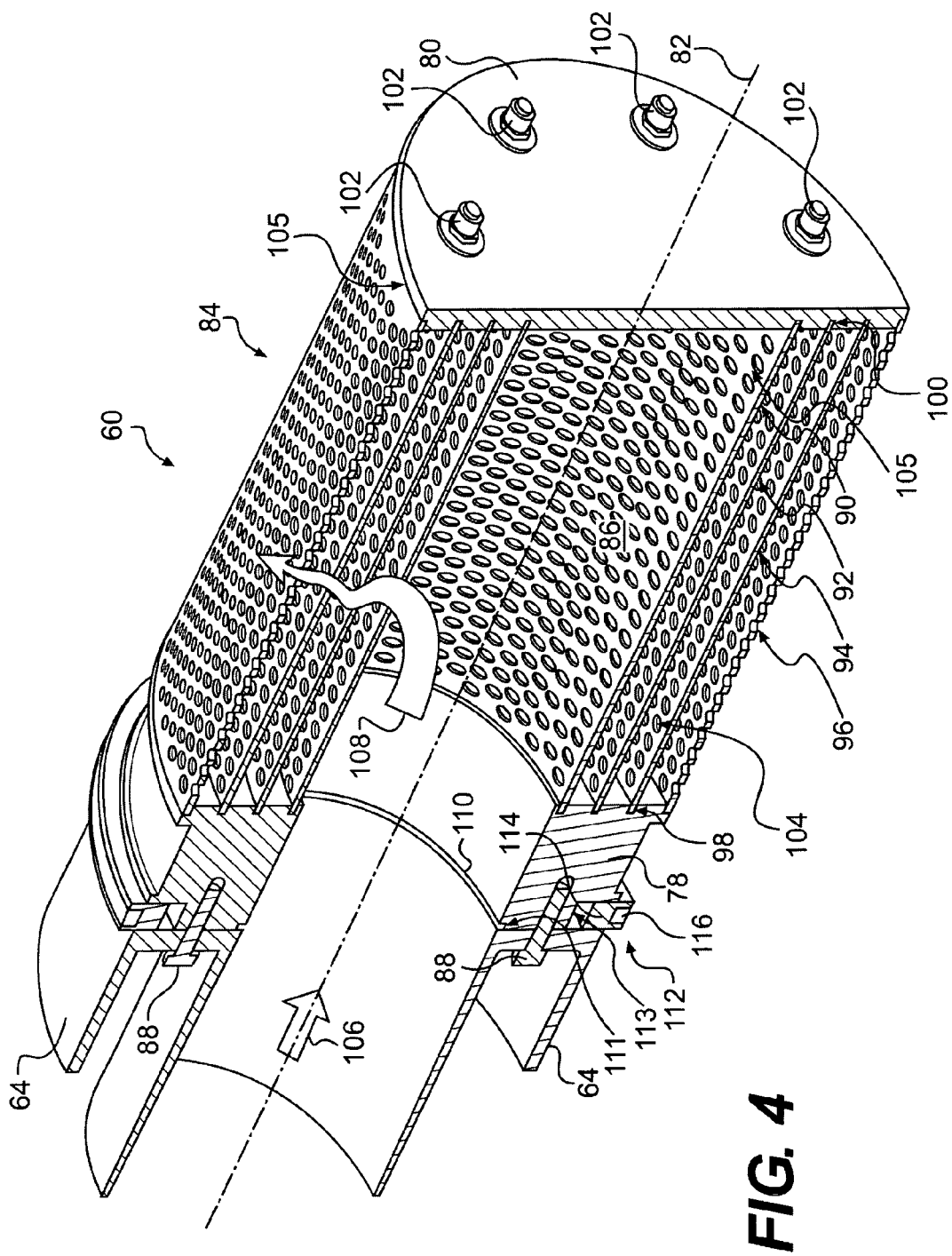
FIG. 4 is a schematic section view of an exemplary diffuser associated with the bleed air assembly of FIG. 3.

As shown in FIG. 4, diffuser 60 may include a plurality of diffuser walls 84. For example, diffuser 60 may include a first diffuser wall 90, a second diffuser wall 92, a third diffuser wall 94, and a forth diffuser wall 96. While four diffuser walls 90, 92, 94, 96 are shown and described, diffuser 60 may include any number of diffuser walls 84. Inlet collar 78 may include one or more concentric grooves 98 that correspond to one or more diffuser walls 84. Likewise, end wall 80 may include one or more concentric grooves 100 that correspond to one or more diffuser walls 84. For example, diffuser walls 90, 92, 94, 96 may be respectively supported concentrically about longitudinal axis 82 at upstream and downstream ends within concentric grooves 98, 100. Diffuser walls 90, 92, 94, 96 may be clamped between inlet collar 78 and end wall 80 via one or more fasteners 102. For example, fasteners 102 may extend parallel to longitudinal axis 82 and may thread into corresponding recesses (not shown) in inlet collar 78.

Diffuser walls 90, 92, 94, 96 may each be substantially cylindrical in shape and may include a plurality of perforations 104. Perforations 104 may be spaced over a respective surface 105 of each diffuser wall 90, 92, 94, 96 and may include round holes, slits, and/or any other shaped passages to permit the bleed air to exit diffuser 60. While perforations 104 are shown substantially evenly spaced, it is contemplated that perforations 104 may be positioned in various patterns or random configurations and may include any number per surface 105. The flow of bleed air represented by arrow 106 that enters diffuser 60 in a direction substantially along longitudinal axis 82 may be redirected at an angle relative to longitudinal axis 82 due to end wall 80. For example, the flow of bleed air may be redirected radially from longitudinal axis 82.

At least one of perforations 104 of each diffuser wall 90, 92, 94, 96 may be at least partially offset from perforations on an immediately adjacent diffuser wall 90, 92, 94, 96, affecting the flow of bleed air to substantially zigzag through subsequent diffuser walls 90, 92, 94, 96 (as illustrated by arrow 108) to reduce the bleed air pressure. Each diffuser wall 90, 92, 94, 96 may include a cumulative opening defined by a percentage of open space created by perforations 104 relative to a total surface area of surface 105.

The cumulative opening of each of diffuser walls 90, 92, 94, 96 may differ from the cumulative opening of another of diffuser walls 90, 92, 94, 96. It is contemplated that the cumulative opening of each of diffuser walls 90, 92, 94, 96 may increase from the inner most diffuser wall (i.e., first diffuser wall 90) to the outer most diffuser wall (i.e., fourth diffuser wall 96), to gradually reduce bleed air velocity by progressively increasing the flow area in the radial direction. In an exemplary embodiment, first diffuser wall 90 may include 15% open space, second diffuser wall 92 may include 20% open space, third diffuser wall 94 may include 25% open space, and fourth diffuser wall 96 may include 33% open space. While the range of 15% to 33% of open space is disclosed in the exemplary embodiment, more or less open space may be designed into diffuser walls 90, 92, 94, 96 to sufficiently reduce the bleed air velocity and pressure. Additionally, more than one diffuser wall 84 may include the same cumulative opening. For example, first, second, and third diffuser walls 90, 92, 94 may each include a cumulative opening of 20% and fourth diffuser wall 96 may include a cumulative opening of 33%.

Diffuser 60 may also include an inner seal 110 mounted in a first annular groove 111 defined between outlet pipe flange 64 and inlet collar 78. Inner seal 110 may be a metallic seal or any other known seal capable of reducing or substantially eliminating bleed air leakage between outlet pipe flange 64 and inlet collar 78. Diffuser 60 may also include an outer seal 112 mounted in a second annular groove 113 between outlet pipe flange 64 and inlet collar 78. Outer seal 112 may include a floating ring 114 and one or more piston seals 116 positioned within second annular groove 113 in order to allow thermal expansion of bleed air assembly 52 and exhaust collector box 38. Piston seals 116 may be pressed fit by floating ring 114 against shoulder 79 of diffuser passage 77 to reduce or substantially eliminate exhaust leakage from exhaust collector chamber 74 through diffuser passage 77 (see FIG. 3). Floating ring 114 and piston seals 116 may be any known ring and seal that permits thermal expansion. It is also contemplated that diffuser 60 may include an expandable boot seal (not shown) positioned between front wall 70 and diffuser 60 to further block exhaust flow from exhaust collector chamber 74 through diffuser passage 77.

Figure 5:
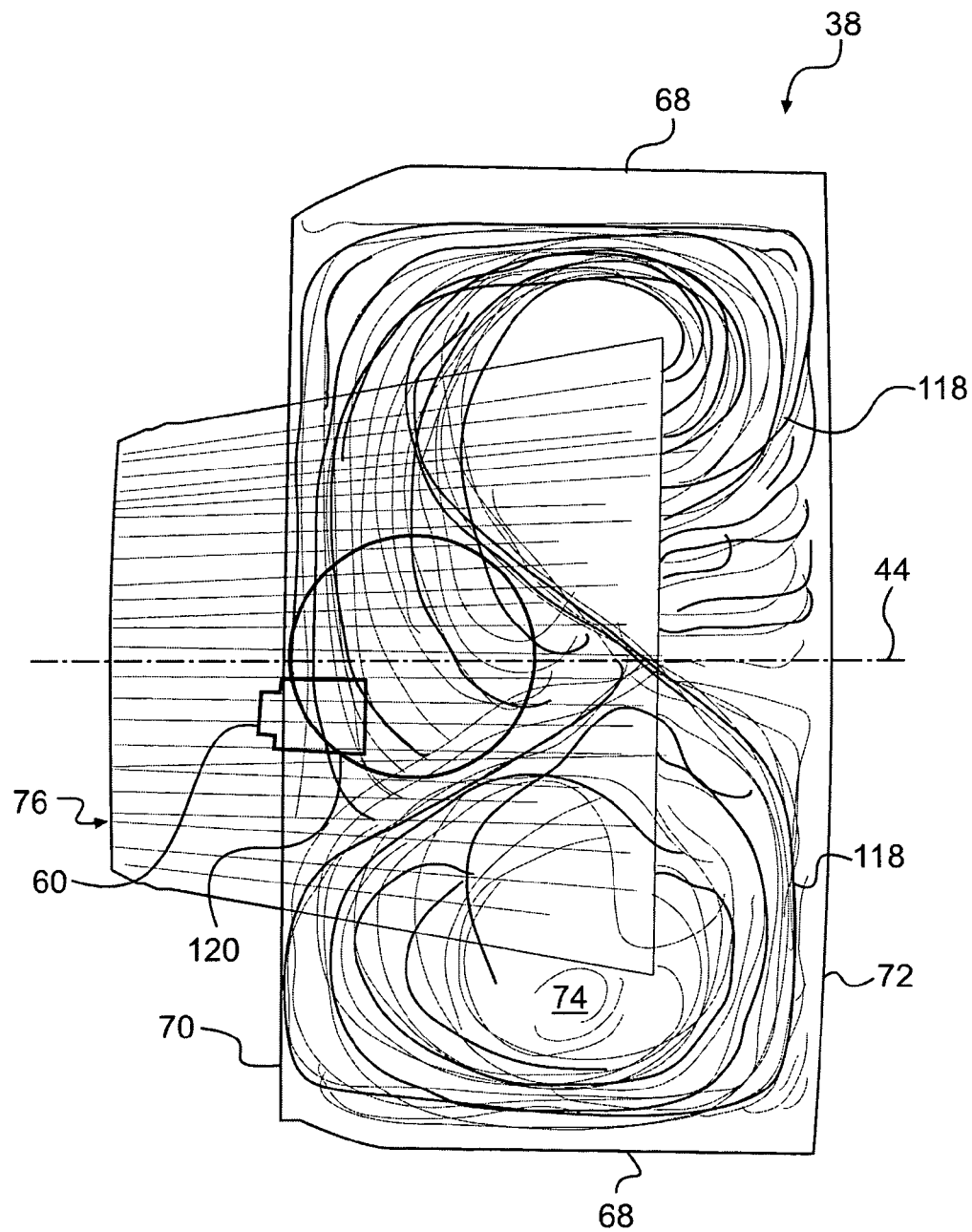
FIG. 5 illustrates an approximation of air flow within the exhaust collector box.

As shown in FIG. 5, the exhaust air that enters exhaust collector chamber 74 of exhaust collector box 38 may define an exhaust flow pattern 118 that includes turbulent air flow from inlet passage 76, toward rear wall 72, and then around a majority of the inner perimeter of exhaust collector chamber 74. After studying typical exhaust flow patterns of GTE 10, an area of substantially stagnant exhaust flow 120 was identified along an inner surface of front wall 70 near a midpoint between sidewalls 68 (i.e. the midpoint of sidewalls 68 corresponds substantially to drive axis 44). It is contemplated that diffuser 60 may be positioned within the area of substantially stagnant exhaust flow 120 and may be offset to a side of the midpoint between sidewalls 68 to provide diffuser 60 with adequate clearance between annular exhaust inlet 75 and exhaust outlet 40 (see FIG. 2). Therefore, diffuser 60 may be positioned in an area of substantially stagnant exhaust flow 120 in order to minimize interference caused by the flow of exhaust within exhaust collector box 38 with the effectiveness of expelling the flow of bleed air through diffuser 60.

INDUSTRIAL APPLICABILITY

The disclosed bleed air diffuser may be applicable to any power source where a portion of compressed air may be diverted. The diffuser may reduce the bleed air velocity and pressure to decrease bleed air induced vibrations in a GTE system. The operation of GTE 10 and bleed air assembly 52 is described below.

A portion of the compressed air generated by compressor section 12 may be diverted at passage 50 into bleed air assembly 52 as bleed air. The amount of compressed air diverted through bleed air assembly 52 may be regulated by valve 56. Bleed air assembly 52 may include one or more obstructions, e.g., elbows, in pipe 54 that may reduce the pressure of the bleed air directed toward exhaust collector box 38. Nonetheless, the bleed air may reach a velocity (e.g., sonic) at the exit of pipe 54 sufficient to induce vibrations within GTE 10 that may cause fatigue within exhaust collector box 38 of other downstream components (not shown) if the bleed air is not diffused.

With reference to FIG. 4, as the bleed air enters diffuser 60, the bleed air may travel along longitudinal axis 82 through inlet collar 78, and into diffuser chamber 86. End wall 80 may block the flow of bleed air along longitudinal axis 82 and direct the bleed air at an angle relative to longitudinal axis 82 toward diffuser walls 90, 92, 94, 96, for example, in a substantially radial direction. As the flow of bleed air changes direction within diffuser chamber 86, the bleed air may pass through perforations 104 in each of diffuser walls 90, 92, 94, 96 before exiting into exhaust collector box 38. The number of diffuser walls 84 and the cumulative openings of each of diffuser walls 90, 92, 94, 96 may affect the reduction in velocity and pressure of the flow of bleed air. The bleed air pressure may be reduced by perforations 104 in each of diffuser walls 90, 92, 94, 96, and the bleed air velocity may be reduced by gradually increasing the flow area through each of diffuser walls 90, 92, 94, 96. For example, diffuser 60 may reduce the velocity of the flow of bleed air from a sonic flow velocity to a subsonic flow velocity.

At least one of the perforations 104 of each of diffuser wall 90, 92, 94, 96 may be at least partially offset from perforations 104 on an immediately adjacent diffuser wall 90, 92, 94, 96, causing the flow of bleed air to substantially zigzag through subsequent diffuser walls 90, 92, 94, 96, as illustrated by arrow 108, to thereby reduce the bleed air velocity and pressure. The diffused bleed air may be directed into an area of substantially stagnant exhaust flow 120 and mix with exhaust air before exiting into the atmosphere via exhaust outlet 40 (see FIG. 5).

Since bleed air assembly 52 reduces bleed air velocity and pressure by passing the bleed air through diffuser 60, bleed air induced vibrations that may cause fatigue in exhaust collector box 38 over time may be reduced or substantially eliminated. Further, bleed air assembly 52 may also be simple and inexpensive because bleed air assembly 52 may not implement a plurality of valves and other components to bypass bleed air around the combustion process.

It will be apparent to those skilled in the art that various modifications and variations can be made to the disclosed system without departing from the scope of the disclosure. Other embodiments of the present disclosure will be apparent to those skilled in the art from consideration of the specification and practice of the method and apparatus disclosed herein. It is intended that the specification and examples be considered as exemplary only, with a true scope of the disclosure being indicated by the following claims and their equivalents.

What is claimed is:

1. An apparatus configured to diffuse a flow of bleed air drawn from upstream of a combustion chamber of a gas turbine engine and directed to an exhaust section of the gas turbine engine, comprising a diffuser having:
    an inlet collar configured to receive the flow of bleed air in a direction substantially along a longitudinal axis of the diffuser;
    an end wall longitudinally spaced from the inlet collar and configured to block the flow of bleed air in a direction substantially along the longitudinal axis;
    a first diffuser wall spaced concentrically relative to a second diffuser wall, each of the first and second diffuser walls encircling the longitudinal axis, being positioned between the inlet collar and the end wall, and including a plurality of perforations configured to permit the flow of bleed air to exit the apparatus at an angle relative to the longitudinal axis; and
    a third diffuser wall spaced concentrically relative to the first and second diffuser walls.

2. The apparatus of claim 1, wherein the first diffuser wall and the second diffuser wall are substantially cylindrical.

3. The apparatus of claim 1, wherein the perforations in the first diffuser wall define a cumulative opening less than a cumulative opening of perforations in the second diffuser wall.

4. The apparatus of claim 1, wherein at least one of the perforations of the first diffuser wall is at least partially offset from the perforations of the second diffuser wall.

5. The apparatus of claim 1, wherein the first diffuser wall and the second diffuser wall are clamped between the inlet collar and the end wall by at least one fastener.

6. The apparatus of claim 1, wherein,
the third diffuser wall includes a plurality of perforations configured to permit the flow of bleed air to exit the apparatus at an angle relative to the longitudinal axis.

7. The apparatus of claim 6, further including a fourth diffuser wall spaced concentrically relative to the first, second, and third diffuser walls,
wherein
the fourth diffuser wall includes a plurality of perforations configured to permit the flow of bleed air to exit the apparatus at an angle relative to the longitudinal axis.

8. The apparatus of claim 1, further including
a pipe configured to allow the flow of bleed air to bypass at least a portion of a gas turbine engine;
wherein the diffuser is connected to a downstream end of the pipe.

9. The apparatus of claim 8, wherein the diffuser is configured to be disposed at least partially within an exhaust collector box.

10. The apparatus of claim 8, wherein the diffuser is configured to reduce the velocity of the flow bleed air from sonic flow to subsonic flow.

11. The apparatus of claim 8, further including a pipe support bracket configured to support substantially the entire weight of the diffuser.

12. The apparatus of claim 8, wherein the pipe includes an outlet pipe flange connected to the inlet collar by one or more fasteners.

13. The apparatus of claim 12, further including a seal positioned between the outlet pipe flange and an inlet collar, wherein the seal is configured to allow thermal expansion of the diffuser within the exhaust collector box.

14. The apparatus of claim 1, wherein
the plurality of perforations included in each the first and second diffuser walls are round holes.

15. An apparatus configured to diffuse a flow of bleed air drawn from upstream of a combustion chamber of a gas turbine engine, comprising:
a diffuser having:
an inlet collar configured to receive the flow of bleed air in a direction substantially along a longitudinal axis of the diffuser;
an end wall longitudinally spaced from the inlet collar and configured to block the flow of bleed air in a direction substantially along the longitudinal axis;
a first diffuser wall and a second diffuser wall spaced concentrically relative to each other, each of the first and second diffuser being positioned between the inlet collar and the end wall and including a plurality of perforations configured to permit the flow of bleed air to exit the apparatus at an angle relative to the longitudinal axis; and
a third diffuser wall spaced concentrically relative to the first and second diffuser walls; and
an exhaust collector box configured to receive a flow of exhaust from a gas turbine engine and receive the flow of bleed air from the diffuser,
wherein the diffuser is disposed at least partially within the exhaust collector box.

16. The apparatus of claim 15, wherein
wherein at least one of the perforations of the first diffuser wall is at least partially offset from the perforations of the second diffuser wall.

17. The apparatus of claim 15, wherein
the diffuser is positioned within the exhaust collector box in an area characterized by low flow of exhaust from the gas turbine engine.

18. The apparatus of claim 17, wherein
the exhaust collector box receives the flow of exhaust through an exhaust air inlet positioned substantially in the center of a wall of the exhaust collector box;
the diffuser is attached to the wall of the exhaust collector box; and
the diffuser is further positioned off-center relative to the wall of the exhaust collector box.

19. The apparatus of claim 15, wherein the diffuser is mostly disposed within the exhaust collector box.

20. A gas turbine engine comprising:
a bleed air pipe;
a combustion section, including:
a combustion liner enclosing a combustion chamber;
a fuel inlet configured to supply fuel to the combustion chamber; and
a bleed air inlet passage, the bleed inlet passage configured to direct a flow of bleed air from the combustion section to the bleed air pipe;
a bleed air valve, the bleed air valve attached to the bleed air pipe and configured to regulate the flow of bleed air therethrough;
an inlet collar configured to receive the flow of bleed air from the bleed air pipe in a direction substantially along a longitudinal axis of the diffuser;
an end wall longitudinally spaced from the inlet collar and configured to block the flow of bleed air in a direction substantially along the longitudinal axis;
a first diffuser wall spaced concentrically relative to a second diffuser wall, each of the first and second diffuser walls encircling the longitudinal axis, being positioned between the inlet collar and the end wall, and including a plurality of perforations configured to permit the flow of bleed air to exit the apparatus at an angle relative to the longitudinal axis; and
a third diffuser wall spaced concentrically relative to the first and second diffuser walls.

* * * * *